Feb. 9, 1943.   C. D. RIEPER   2,310,373
ATTACHMENT FOR MILLING MACHINES TO FACILITATE PRECISION REPRODUCTION
OR DUPLICATION OF ARTICLES OR TEMPLATES
Filed Jan. 2, 1940   3 Sheets-Sheet 2

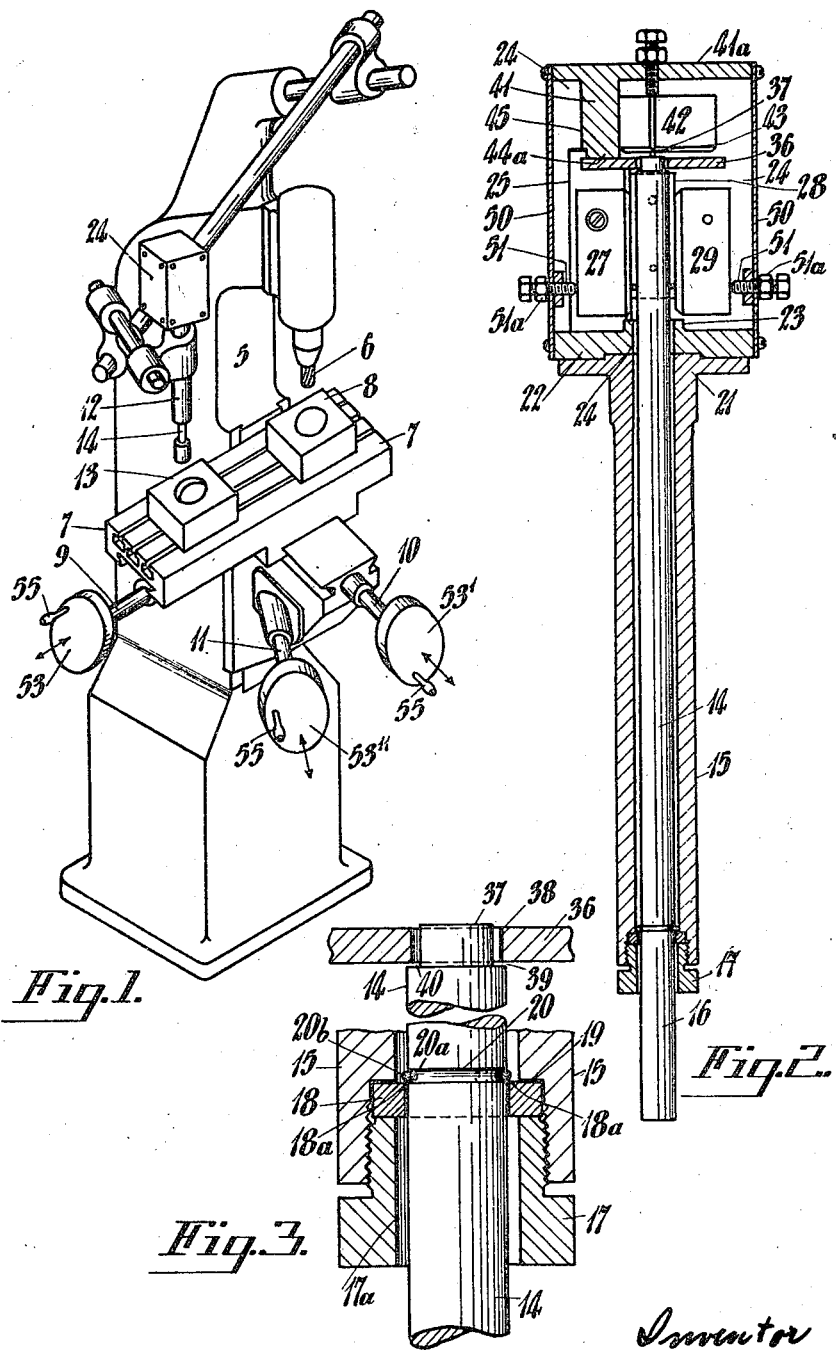

Inventor:
C. D. Rieper.

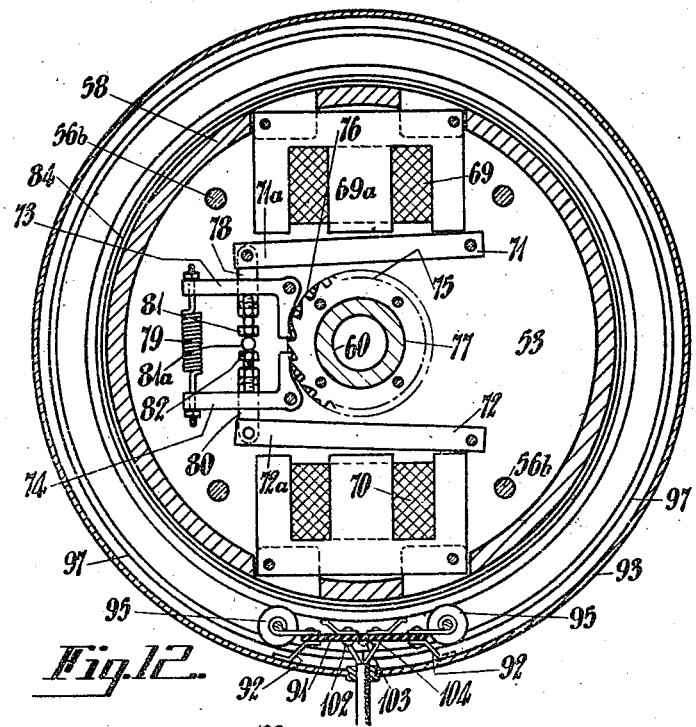
Fig. 12.
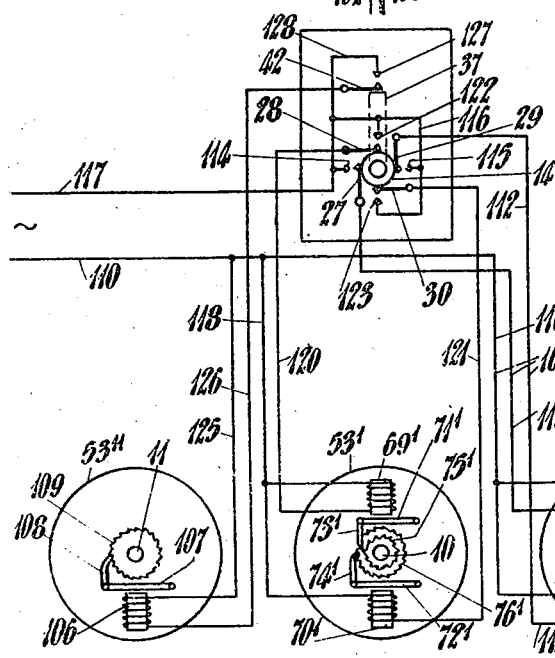
Fig. 13.
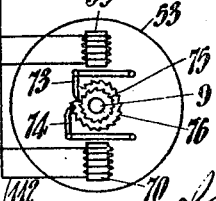

Patented Feb. 9, 1943

2,310,373

UNITED STATES PATENT OFFICE 2,310,373

ATTACHMENT FOR MILLING MACHINES TO FACILITATE PRECISION REPRODUCTION OR DUPLICATION OF ARTICLES OR TEMPLATES

Claude Detlev Rieper, Deepdene, Victoria, Australia

Application January 2, 1940, Serial No. 312,144
In Australia February 4, 1939

21 Claims. (Cl. 90—13.2)

This invention relates to a manually operable machine tool such as milling machine, convertible into a duplicating machine by an attachment including an electrical three-dimensional tracer adapted to traverse a pattern and thereby automatically govern the manually controlled work piece and tool or cutter engagement according to the contouring and depth governing limits imposed by the pattern.

It is the principal object of this invention to provide improvements in the above mentioned type of machine converting attachment, directed to the provision of an effective drive for the work support or movable table of a manually operable machine tool, to permit the latter to be utilized for either duplicating operation or simple milling or boring practice in the absence of tracer control.

A further object of the invention is to provide an improved manual actuator for each feed device of the work support in substitution for the conventional hand wheel, the actuator also serving to conveniently house clutch mechanism controlled by motor means within said actuator and cooperating with the tracer to automatically control the manually actuated forward and reverse drive of the work support.

In the drawings:

Fig. 1 is a perspective view of a milling machine incorporating the attachment for effecting precision duplication from an article or template.

Fig. 2 is a central section of the tracer or stylus and,

Fig. 3 is an enlarged section thereof illustrating the pivotal mounting of the tracer rod.

Fig. 12 is a central sectional elevation of Fig. 11.

Fig. 13 is a schematic circuit illustrating a layout of the switching system of the stylus for actuating the electro magnets controlling the clutches in the three feed shafts of the machine.

Figure 4:
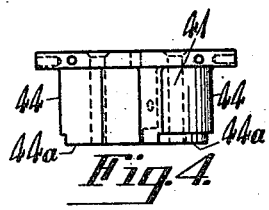
Fig. 4 is a detail side elevation of the upper switch supporting bracket in the head of the stylus, and, Fig. 5 is an underside plan of Fig. 4.

In Fig. 1 of the accompanying drawings a standard milling machine 5 is illustrated having a rotary tool 6 vertically disposed over a movable table 7 on which the work piece 8 is suitably clamped below said tool 6. The movable table is provided with three independent feed shafts 9, 10, 11 manually operable to respectively move the table 7 longitudinally, laterally and vertically to feed the work piece into engagement with the rotary tool 6.

A stylus 12 is adjustably mounted on the head of the machine in vertical parallelism with the rotary cutting tool 6 and in longitudinal alignment with the latter above the movable table 7 to operatively position said stylus 12 relatively to the article or template 13 to be reproduced or duplicated which is conveniently clamped to said movable table in spaced relationship to the work piece 8 below said stylus, whereby in operation the article or template 13 moves correspondingly with the work piece 8.

As illustrated in Fig. 2 the stylus 12 comprises a flexible tracer rod 14 freely mounted within a sleeve 15 with the lower end 16 of said rod extending outwardly from said sleeve to form a contact section to engage with the article or template to be duplicated, the upper end of said rod being adapted to engage with a bank or group of control or limit switches located in the head of the stylus 12 as hereinafter described.

As illustrated in Fig. 3 the base of the sleeve 15 is threaded to receive an apertured threaded cap 17 the upper end of which seats against a hardened transverse ring 18 located on an annular shoulder 19 formed in the bore of said sleeve.

The aperture 17a in threaded cap 17 provides a substantial clearance around the tracer rod 14 to permit unobstructed deflection of the latter.

The tracer rod 14 immediately above the transverse ring 18 is formed with a semi-circular shaped annular groove 20 in which a spring bead member 20a is located to form a peripheral projection 20b around the circumference of the rod at this position.

The bore of the transverse ring 18 is of predetermined diameter to provide a minimum clearance for the passage therethrough of the tracer rod 14 and to permit a limited deflection of said rod in all directions from the normal position, including a limited lifting movement.

The deflection of the tracer rod is controlled by the peripheral projection 20b of the bead member seating upon the internal peripheral edge 18a of the transverse ring 18, which constitutes a continuous fulcrum as illustrated in Fig. 2.

The bead member 20a on the tracer rod 14 also operates to maintain the latter in an assembled position within the sleeve 15. The upper end of the above 15 is formed with a stepped flange 21 to receive the correspondingly recessed base plate 22 of the lower switch supporting bracket 23 located in the head 24 of the stylus 12.

The base plate 22 is provided with a central opening 24 to permit the tracer rod 14 of the stylus to pass therethrough.

Figure 8:
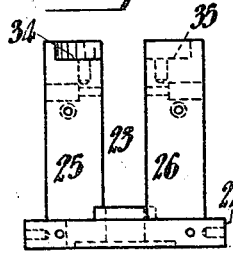
Fig. 8 is a side elevation of the lower switch supporting bracket in the head of the stylus.
Figure 9:
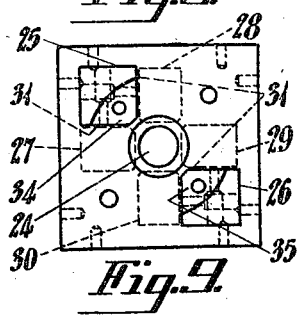
Fig. 9 is a plan view of Fig. 8.

The lower switch supporting bracket as illustrated in Figs. 8 and 9 comprises the square base plate 22 on which is formed two vertical pillars 25—26 diagonally arranged each side of the central opening 24 in said base plate.

The diagonally opposite pillars 25—26 are square in cross section with the sides thereof arranged in parallelism with the sides of the base plate 22 to provide two spaced and oppositely disposed right angular walls to which the switches controlling the longitudinal and lateral horizontal movements of movable table 7, are adjustably secured.

Figure 10:
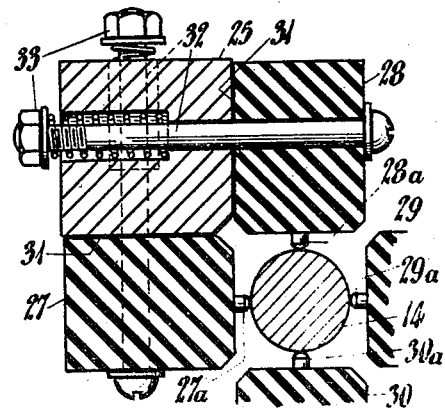
Fig. 10 is an enlarged sectional plan illustrating the mounting and arrangement of the switches relative to the tracer rod for controlling the longitudinal and lateral movements of the machine table.

As illustrated in Figs. 9 and 10 four switches 27, 28, 29 and 30 are employed with the inner walls 31 secured to the adjacent right angular walls of the pillars 25—26 said switches being vertically disposed and spaced around the tracer rod 14 of the stylus with independent projecting depressible elements or push buttons 27a, 28a, 29a, and 30a respectively, which are arranged in diametrically opposite pairs relatively to the axis of and in contact with the circumference of said tracer rod. The switches are normally in the open or off position and are located as described, so that either one of each diametrically opposite pairs of switches may be operated under the deflection of the tracer rod when effected by lateral or longitudinal movements of the movable table.

As illustrated in Fig. 10 the control switches 27, 28, 29 and 30 are each adjustably mounted to the pillars 25—26 by a spring urged bolt 32 capable of adjustment by nut 33 to yieldably retain each switch in the operative position illustrated.

The spring urged bolts 32 are disposed one above the other and at right angles to secure each adjacent pair of switches such as 27, 28 to the one pillar 25 (as illustrated in Fig. 2), while switches 28 and 29 are similarly arranged in pillar 26.

The upper end of each pillar 25—26 is formed with a stepped arcuate ledge 34—35 to centrally seat a disc stop member 36 about a short reduced stem 37 on the upper extremity of the tracer rod 14.

The disc stop member 36 is centrally apertured to accommodate the stem 37 with a limited clearance to permit the deflection of the tracer rod 14, and a clearance 39 is provided between the annular shoulder 40 on the tracer rod at the base of said stem and the under-surface of the stop member 36 to limit the upward axial movement or lift of the tracer rod 14.

Disposed above the disc stop member 36 and bearing upon the latter and the top of each pillar 25—26 is an upper switch supporting bracket 41 carrying a control or limit switch 42 having a projecting depressible element or push button 43 engaging with the top of the stem 37 of the tracer rod 14, and operable upon the upward vertical movement of the latter.

Figure 5:
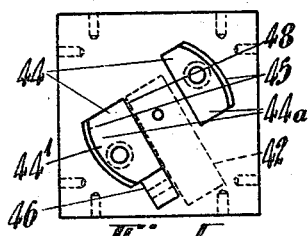
Figure 6:
Figs. 6 and 7 are side elevation and plan views respectively of the stop member limiting the vertical and lateral movement of the top of the tracer rod.
Figure 7:
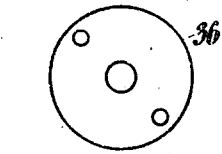

The upper switch supporting bracket 41 as illustrated in Figs. 4 and 5 comprises an upper square plate 41a of equivalent dimensions to the above described base plate 22 with two diagonally opposite depending pillars 44 having a flat base portion 44a with an outer arcuate abutment 45 to seat on the upper surface of the pillars 25—26 above the stepped arcuate ledges 34—35 thereon, the lower flat base portions 44a bearing on the surface of the disc stop member 36 in the manner illustrated in Fig. 2.

One pillar 44' has formed therewith an integral lug 46 drilled to receive a spring urged bolt for adjustably securing the control or limit switch 42 (shown in dotted lines Fig. 5) to the inner flat wall 48 of said pillar, the switch being arranged between the pillars 44 as illustrated in dotted lines Fig. 5 so that the projecting push button will be in vertical alignment with the axis of the tracer rod 14.

Side plates 50 are attached to the aligning ends of the base plate 22 and upper plate 41a of the switch supporting brackets to complete the closure of the head of the stylus.

Set screws 51 lock nuts 51a thereon extend through the side plates 50 and the upper square plate 41a to impinge on the outer walls of the various limit switches described in alignment with the projecting depressible elements or push buttons to ensure that the latter are in correct spaced relationship with the surface of the tracer rod 14, the yielding attachment of the upper ends of said switches to the walls of the pillars by the spring urged bolts 32 permitting this adjustment by the set screws 51.

The limit switches 27, 28, 29, 30 and 42 of the stylus for limiting the lateral, longitudinal and vertical movements of the movable table 7 are highly sensitive to respond to the limited deflectional movements of the tracer rod 14 of the stylus, and for this purpose standard microgap switches are preferred.

The head 24 of the stylus 12 has included therewith sockets (not shown) to receive the various electrical leads from the main supply and to the electromagnets controlling the clutches in the manually operable casings upon the feed shafts 9, 10, 11 of the machine as is indicated in the hereinafter described schematic circuit illustrated in Fig. 13.

Figure 11:
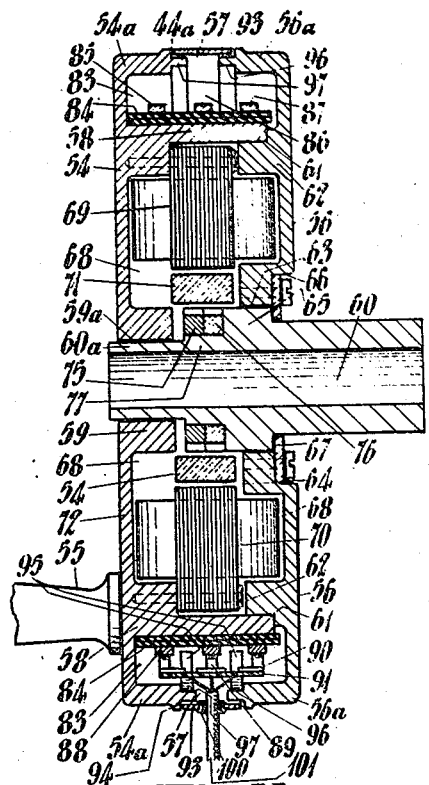
Fig. 11 is a central sectional plan of one of the rotary manually operable casings mounted on each feed shafts of the machine and housing the electro magnetically controlled clutches interposed in said shafts.

Figs. 11 and 12 illustrate one of the manually operable casings mounted on each feed shaft 9—10—11 in lieu of the hand wheels normally disposed on the feed shafts of the movable table, said casings housing the electromagnetically controlled clutches operatively connected with each shaft for manually rotating the same in the required direction and for automatically terminating the rotation of said shaft under the directional influence of the stylus.

The manually operable casings for disposal upon the feed shafts 9 and 10 for laterally and longitudinally moving the movable table 7 and which contain a pair of electromagnetically controlled clutches will now be described.

Each casing 53 comprises an outer flanged member 54 carrying an operative handle 55 and an inner flanged complementary member 56 of equivalent diameter circumferentially spaced from the outer member 54 by an annular clearance 57 between the inner peripheral edges of the flanges 54a—56a of said complementary casing members.

The outer casing member 54 is formed internally with an outer recessed boss 58 and shorter boss 59 the bore 59a of which rotatively seats upon the reduced end 60a of a sleeve 60 adapted to be keyed or otherwise mechanically coupled to the feed shaft.

The end of outer boss 58 is secured to a stepped mating flange 61 on the exterior of an outer recessed boss 62 formed in the inner member 56 of the casing.

The bore 63 of the inner boss 64 of casing member 56 rotatively seats on a collar 65 of the sleeve 60, an outer recess 66 in said boss having fitted thereto an apertured sealing plate 67 disposed around said sleeve as illustrated in Fig. 11.

The complementary members 54—56 of said casing are retained in assembly by a plurality of transverse bolts 56b illustrated in Fig. 12.

The internal space between the inner and outer bosses of each casing member 54—56 forms an inner annulus 68 of variable width to conveniently house two diametrically opposite electromagnets 69—70 of known construction such as the "E" core type illustrated in Fig. 12 for controlling the clutches incorporated with the sleeve 60.

As illustrated in Fig. 12 each electromagnet has a pivoted keeper or armature 71—72 to control the clutches which comprises spring loaded pawls 73—74 carried between the casing members 54—56 oppositely disposed to normally engage with one of a pair of ratchet wheels 75—76 having oppositely disposed teeth and co-axially and adjacently mounted on a flange 77 formed on the sleeve 60. The teeth of the ratchet wheels 75—76 provide a driving connection between the sleeve 60 and the pawls in either direction in order to rotate the sleeve 60 and the feeding shaft connected with the latter in accordance with the direction of rotation imparted by the handle 55.

As illustrated in Fig. 12, armature 71 is pivoted at one end and at the other end 71a pivotally connected to a short depending yoke 78 through which the arm of pawl 73 is extended to connect a spring 79 anchored to said arm and the outer end of the arm of pawl 74; a spring 79 is arranged to normally retain the pawls 73—74 in engagement with the ratchet wheels 75—76.

The arm of pawl 74 is similarly connected to armature 72 by a yoke 80 pivoted to the end 72a of said armature 72.

Aligning set screws 81—82 project through the end of each yoke 78—80 to impinge on the lower and upper sides respectively of the pawl arms to adjustably position the pawls 73—74 within said yokes, the head of each set screw engaging with a pin 81a under the pressure of spring 79 forming a limit adjustment to ensure positive driving engagement of said pawls with said ratchet wheels.

If electromagnet 69 is energized as hereinafter described, armature 71 is forcibly attracted to core 69a of said magnet whereby yoke 78 operating upon the arm of pawl 73 imparts an angular movement to the latter against the pressure of spring 79 sufficient to withdraw said pawl from engagement with the teeth of ratchet wheel 75 while pawl 74 remains in engagement with ratchet wheel 76.

If electromagnet 70 is energized, armature 72 similarly withdraws pawl 74 from engagement with ratchet wheel 76 while pawl 73 retains engagement with ratchet wheel 75.

The space between the outer side of boss 58 of the outer casing member 54 and the inside of flanges 54a—56a of the complementary casing members 54—56 forms an outer annulus 83 to house the electrical current conveying means for the electromagnets 69—70 as will now be described.

Disposed around the outer flat side of boss 58 is an insulated sheath 84 on which are disposed three spaced slip rings 85, 86 and 87, in constant engagement with three wiping contacts 88, 89, and 90 mounted upon an insulated base plate 91 secured by spaced brackets 92 to an external cover band 93 disposed on aligning annular depressed shoulders 94 in the external surface of the flanges 54a—56a of the complementary casing members 54—56. The cover band 93 effects a closure of the annular clearance 57 between the flanges 54a—56a of the complementary casing members as illustrated in Fig. 11.

The above described base plate 91 at each end is provided with a pair of spaced rollers 95 constituting in effect a trolley to engage with annular tracks 96—97 formed on the extremity of the inside walls of flanges 54a—56a of the complementary casing members of the construction being such that as the casing is rotated in either direction, the spaced pairs of rollers 95 rotate, but remain stationary in engagement with said annular tracks 96—97 with wiper contact 88, 89 and 90 in engagement with internal slip rings 85, 86 and 87.

The base plate 91 of the trolley has an opening 100 therein to permit the insertion of an electrical cable lead 101 from the source of current supply, to feed electrical current to the terminals 102, 103 and 104 on said base plate in circuit with the wiper contacts 88, 89 and 90.

The central wiper contact 89 through engagement with the slip ring 86 provides a common electrical feed from the main supply to each electromagnet 69—70 while wiper contacts 88 and 90 through engagement with slip rings 85 and 87 provide an independent electrical feed to each electromagnet from one of the two diametrically opposite pairs of limit switches 27—29 or 28—30 in the head of the stylus 12 controlling the longitudinal and lateral movements of the movable table 7 as will be hereinafter described.

As illustrated in Fig. 13 the manually operable casing 53'' applied to the feed shaft 11 for vertically raising and lowering the movable table 7; the stylus 12, by limit switch 42, merely influences the upward movement of said table whereby only one electromagnetically controlled clutch is required comprising electromagnet 106 with an armature 107 to control the engagement and withdrawal of a pawl 108 from a ratchet wheel 109 carried on the sleeve to receive said shaft 11; otherwise mechanically the construction of this manually operable casing 53'' is similar to that construction already described.

In the apparatus hereinbefore described with reference to the accompanying drawings the various electrical cables leads and connections have been omitted to clearly illustrate the mechanical construction of the apparatus, the electrical circuit between the control or limit switches 27, 28, 29, 30 and 42 in the stylus 12, the main supply and the electromagnets 69, 70 and 106, in the manually operable casings being illustrated in the schematic circuit Fig. 13 which will now be described.

Assuming casing 53 above described is disposed on feed shaft 9 adapted to move the movable table 7 longitudinally as indicated by the directional arrow in Fig. 1 the above described electrical lead 101 includes a supply line 110 from the main supply, which line is common to one side of each winding of electromagnets 69—70.

The other side of electromagnets 70 is coupled by lead 112 with limit switch 29 while the other side of the winding of electromagnet 69 is separately coupled by lead 113 to one terminal of limit switch 27, whereby electrical lead 101 comprises common supply line 110 from the main supply and separate electrical leads 112—113 to limit switches 27—29 the fixed contacts 114—115 of which are in circuit with a branch lead 116 from the other main supply line 117 to complete this section of the circuit. Limit switches 27—29 are arranged diametrically opposite each other relatively to the tracer rod 14 of the stylus 12 whereby longitudinal movement of the movable table 7 in either direction by rotating handle casing 53 will, upon contact being established between the tracer rod 14 of stylus 12 and the article or template 13, cause said rod to engage with either of the depressible elements or buttons 27a—29a of said switches (Fig. 10) to close the circuit with respect to one of the electromagnets 71—72, and thereby withdraw pawl 73 or 74 from ratchet wheel 75—76 to automatically terminate the rotation of the shaft 9 feeding movable table 7 in the direction which established contact between the article or template and said tracer rod.

Manually operable casing 53' mounted on the feed shaft 10 for laterally moving the movable table 7 includes electromagnets 69'—70' and pivoted armatures 71'—72' with pawls 73'—74' pivotally connected thereto in engagement with ratchet wheels 75'—76', similarly to and in the manner described with reference to handle casing 53. A branch lead 118 from main supply line 110 is common to one side of each winding of electromagnets 69'—70', the other side of the winding of electromagnet 69' is coupled by separate lead 120 to one terminal of limit switch 28 while the other side of the winding of electromagnet 70' is coupled by a separate electrical lead 121 to one terminal of limit switch 30.

The fixed contacts 122—123 of limit switches 28—30 are fed by branch lead 116 from the main supply line 117, whereby upon the tracer rod 14 of the stylus being deflected by contact with the article or template 13 during the lateral movement of movable table 7 by rotation of manually operable casing 53' either one of limit switches 28, 30 is operated to close the circuit of one of electromagnets 69'—70' to withdraw the particular pawl 73'—74' from engagement with its ratchet wheel 75'—76' to automatically terminate the operative rotation of feed shaft 10 in feeding the movable table 7 in the direction which established contact between the article or template and said tracer rod.

The coil of the electromagnet 106 in manually operable casing 53" for operating feed shaft 11 to raise and lower movable table 7 has one end connected to a branch lead 125 from the main supply line 110 with the other end of said coil having a separate electrical lead 126 to one terminal of vertical limit switch 42. The fixed contact 127 of limit switch 42 is fed by a branch lead 128 from the main supply line 117 to complete this section of the circuit whereby when movable table 7 is elevated by operation of handle casing 53" to permit the upper stem 37 of the tracer rod 14 (shown offset to clearly illustrate the arrangement of limit switches) to engage with limit switch 42 the circuit of electromagnet 106 is closed to withdraw pawl 108 from engagement with ratchet wheel 109, to declutch and terminate rotation of feed shaft 11.

When a pawl is withdrawn from engagement with a particular ratchet wheel in the manner above described although the manually operable casing may be rotated in the same feeding direction for a period by the operator, said casing merely free wheels on the sleeve 60 as no driving connection exists between the latter and said casing and consequently the feed shaft coupled thereto, whereby no further cutting operation can be performed by the rotary tool under the particular directional movement of the movable table 7 which established contact between the tracer rod 14 and the article or template 13. The manually operable casing is however free to rotate in the opposite direction and impart a reverse drive to the particular feed shaft to disengage the tracer rod from contact with the article or template in view of the engagement of the other pawl with the adjacent co-axial ratchet wheel disposed on sleeve 60.

In operation referring to Fig. 1 the operator sets up the template or article 13 to be reproduced or duplicated, and the work piece 8 upon the movable table 7 relatively to the tracer rod 14 of the stylus 12 and the rotary cutting tool 6 respectively, the bottom extremity of the tracer rod 14 if necessary being fitted with an adaptor so as to coincide with the size and shape of the rotary cutting tool 6.

Assuming in the exemplification of article or template 13 illustrated in Fig. 1 it is required to reproduce the circular recess therein upon the work piece 8, the operator by manipulating the handle casings 53, 53', 53" controlling the lateral, longitudinal and vertical movements of the movable table 7 centers the recess in said template below the axis of the tracer rod 14; the movable table 7 is then raised by handle casing 53" until the end of the tracer rod 14 is in alignment with the peripheral edge of the recess whereby upon sufficient movement of the table either laterally or longitudinally the peripheral edge of said recess in the article or template will contact with the side of the tracer rod.

Similarly if the movable table is raised the base wall of the recess will contact with the lower extremity of the tracer rod 14, whereby said rod 14 is set to contact with the walls of said recess in accordance with each or any of the operative movements of the movable table.

The operator then manipulates one or more of the handle casings 53, 53', 53" to move the movable table 7 and feed the work piece 8 into engagement with the rotary cutting tool 6 in accordance with standard milling practice.

Assuming handle casings 53—53' are operated to move the movable table 7 and work piece 8 inwardly towards the right hand side of the machine the operator by visual reference to the article or template is able to control the cutting operation of rotary tool 6 to follow the contour of the recess in the article or template 13 which is also moving in synchronism with the movement of said work piece 8. Under continued movement of the movable table 7 the tracer rod 14 of the stylus will contact with the edge of the recess in the article or template causing deflection of said tracer rod to engage with either of depressible elements or buttons 28a—29a of limit switches 28—29 whereby either electromagnet 69' or 70 (see Fig. 13) is energized to withdraw pawl 73' or 73 from engagement with ratchet wheel 75' or 75 to declutch manually operable casings 53, 53' from feed shafts 9—10 with respect to the inward feeding operation described.

The directionally declutched casing can then be manually operated in a reverse direction to commence a further cutting operation.

The depth of cut by rotary tool is controlled by upper limit switch 42 in the stylus as excessive vertical movement of the article or template 13 will establish contact between the bottom of the recess and lower end of tracer rod 14 which effects engagement of stem 37 with the depressible elements or buttons 43 of said switch to energize electromagnet 106 and thereby withdraw pawl 108 from engagement with ratchet wheel 109 to declutch handle casing 53" relatively to feed shaft 11 in the direction of rotation vertically feeding the movable table. When this action occurs the operator imparts a reverse rotation to the handle casing 53" to lower the movable table 7 to permit further cutting operations by the rotary tool by manipulating the handle casings in the required direction of rotation to complete the milling of a recess in the work piece of similar contour and dimensions as the recess in the template or article 13 to be reproduced or duplicated, thereby effecting a 1 to 1 reproduction or duplication.

In continued operation each and every movement of the movable table 7 is controlled by the setting of the stylus 12 so that upon contact with walls of the recess the particular directional movement of the table is automatically terminated by the operation of the limit switch actuated by the deflection of the tracer rod 14 effected by the contact with said walls, as will be readily understood by reference to Fig. 13 of the accompanying drawings.

To effect the reproduction or duplication of the shape of the exterior or peripheral walls of the article or template 13 in the work piece 8, the stylus 12 is operatively positioned to one side of each wall of said article or template in sequence and the limit of movement of the movable table 7 in feeding the work piece 8 to the rotary tool 6 will again be controlled by the tracer rod 14 engaging with the side walls to actuate the particular limit switches in accordance with the direction movement of the movable table 7 as hereinbefore described.

I claim:

1. In a manually operable machine tool convertible into a duplicating machine, a rotary cutter; a support for the cutter; a work support guided in a definite path relatively to the cutter and adapted to support a pattern and a work piece with the latter in position to be acted upon by the cutter, traversing means for the work support, manually operable means for actuating the traversing means, a pair of normally engaged reversely acting ratchet clutches forming the operative connection between said manually operable means and said traversing means, and controllable motor means to selectively disengage one or the other of said ratchet clutches.

2. In a manually operable machine tool convertible into a duplicating machine, a rotary cutter, a support for the cutter, a work support guided in at least two paths substantially at right angles to each other, and adapted to support a pattern and a work piece with the latter in position to be acted upon by the cutter, traversing means for the work support, one for each of said paths, separate manually operable actuating means for each traversing means, pairs of normally engaged reversely acting ratchet clutches, each pair forming the operating connection between one actuating means and its corresponding traversing means, and controllable motor means serving when active to selectively disengage one or the other ratchet clutch of a corresponding pair.

3. In a manually operable machine tool convertible into a duplicating machine, the combination of a rotary cutter, a support for the cutter, a work support guided in a definite path relatively to the cutter and adapted to support a pattern and a work piece with the latter in a position to be acted upon by the cutter, a feed device for the work support, a manually operable actuator for the feed device, a pair of normally engaged reversely acting ratchet clutches forming the operating connection between said actuator and said feed device, and controllable motor means for disengaging said clutches selectively.

4. In a manually operable machine tool convertible into a duplicating machine, the combination of a rotary cutter, a support for the cutter, a work support guided in a definite path relatively to the cutter and adapted to support a pattern and a work piece with the latter in a position to be acted upon by the cutter, a feed device for the work support, a manually operable actuator for the feed device, a pair of normally engaged reversely acting ratchet clutches forming the operative connection between said actuator and said feed device, and electromagnetic means for disengaging said clutches selectively.

5. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, traversing means for the work support, manually operable means for actuating the traversing means, a pair of normally engaged reversely acting ratchet clutches forming the operative connection between said manually operable means and said traversing means, and electromagnetic means for disengaging said clutches selectively.

6. In a manually operable machine tool convertible into a duplicating machine, a rotary cutter, a support for the cutter, a work support guided in at least two paths substantially at right angles to each other, and adapted to support a pattern and a work piece with the latter in position to be acted upon by the cutter, traversing means for the work support, one for each of said paths, separate manually operable actuating means for each traversing means, pairs of normally engaged reversely acting ratchet clutches, each pair forming the operative connection between one actuating means and its corresponding traversing means, and electromagnetic means serving when active to selectively disengage one or other ratchet clutch of a corresponding pair.

7. In a manually operable machine tool convertible into a duplicating machine, a rotary cutter, a support for the cutter, a work support guided in at least two paths substantially at right angles to each other, and adapted to support a pattern and a work piece with the latter in position to be acted upon by the cutter, feed devices for the work support, one for each of said paths, separate manually operable actuating means for each feed device, pairs of normally engaged reversely acting ratchet clutches, each pair forming the operative connection between one actuating means and its corresponding feed device, and electromagnetic means serving when active to selectively disengage one or the other ratchet clutch of a corresponding pair.

8. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, a feed shaft for moving the work support, a manually operable casing disposed on the feed shaft to actuate the latter, a pair of normally engaged reversely acting ratchet clutches located within and forming the operative connection between the manually operable casing and said feed shaft, and controllable motor means located within said casing for disengaging said clutches selectively.

9. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, a feed shaft for moving the work support, a manually operable casing disposed on the feed shaft to actuate the latter, a pair of normally engaged reversely acting ratchet clutches located within and forming the operative connection between the manually operable casing and said feed shaft, and electromagnetic means disposed in the said casing for disengaging said clutches selectively.

10. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, feed shafts for moving the work support, one for each of said paths, a manually operable casing disposed on each feed shaft to actuate the latter pairs of normally engaged reversely acting ratchet clutches, each pair located within and forming the operative connection between a manually operable casing and its corresponding feed shaft, and electromagnetic means disposed within each manually operable casing and serving when active to selectively disengage one or the other ratchet clutch of a corresponding pair.

11. In a manually operable machine tool convertible into a duplicating machine, a movable table guided in two paths substantially at right angles to each other in the horizontal plane and in a third path in the vertical plane, said table adapted to support a pattern and a work piece with the latter in position to be acted upon by the cutter, feed devices for the movable table, one for each of said paths; separate manually operable actuators for each feed device, pairs of normally engaged reversely acting ratchet clutches, forming the operative connection between said actuators and the feed devices guiding said table in the horizontal plane, controllable motor means serving when active to selectively disengage one or other ratchet clutch of a corresponding pair; a normally engaged ratchet clutch forming the operative connection between the manually operable actuator and feed device guiding the movable table in the vertical plane, and controllable motor means serving when active to disengage said ratchet clutch.

12. In a manually operable machine tool convertible into a duplicating machine, a movable table guided in two paths substantially at right angles to each other in the horizontal plane and in a third path in the vertical plane, said table adapted to support a pattern and a work piece with the latter in position to be acted upon by the cutter, feed shafts for the movable table, one for each of said paths, separate manually operable actuators for each feed shaft, pairs of normally engaged reversely acting ratchet clutches, each pair forming the operative connection between said actuators and the feed shafts guiding the movable table in the horizontal plane, electromagnetic means serving when active to selectively disengage one or the other ratchet clutch of a corresponding pair, a normally engaged ratchet clutch forming the operative connection between the manually operable actuator and feed shaft guiding the movable table in the vertical plane, and electromagnetic means serving when active to disengage said ratchet clutch.

13. In a manually operable machine tool convertible into a duplicating machine, a movable table guided in two paths substantially at right angles to each other in the horizontal plane and in a third path in the vertical plane, said table adapted to support a pattern and a work piece with the latter in position to be acted upon by the cutter, feed shafts for the movable table, one for each of said paths, separate manually operable casings disposed upon each feed shaft to separately actuate the latter, pairs of normally engaged reversely acting ratchet clutches, each pair disposed within and forming the operative connection between one of said casings and a feed shaft guiding the movable table in the horizontal plane, electromagnetic means housed with each of said casings, and serving when active to selectively disengage one or the other ratchet clutch of a corresponding pair, a normally engaged ratchet clutch disposed within and forming the operative connection between the manually operable casing on the feed shaft guiding the movable table in the vertical plane, and electromagnetic means located within said casing and serving when active to disengage said ratchet clutch.

14. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, a feed shaft for moving the work support, a manually operable casing disposed on the feed shaft to actuate the latter, a pair of normally engaged reversely acting ratchet clutches located within and forming the operative connection between the manually operable casing and said feed shaft, electromagnetic means disposed with said casing for disengaging said clutches selectively, and means in said manually operable casing to receive and convey electrical current to said electromagnetic means.

15. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, a feed shaft for moving the work support, a manually operable casing disposed on the feed shaft to actuate the latter, an axial sleeve extended through the manually operable casing to rotate in unison with the feed shaft, a pair of ratchet wheels coaxially mounted on said sleeve within said casing, the teeth of one ratchet wheel oppositely disposed to the teeth of the other ratchet wheel, a pair of spring urged pawls pivotally connected to said casing, each arranged to engage with one of the ratchet wheels, an armature operatively connected to each pawl, and an electromagnet juxtaposed to said armature, serving when active to energize the latter.

16. In a manually operable machine tool convertible into a duplicating machine, a rotary cutter, a support for the cutter, a work support guided in a definite path relative to the cutter and adapted to support a pattern and a work piece with the latter in position to be acted upon by the cutter, a feed shaft for moving the work support, a manually operable casing disposed on the feed shaft to actuate the latter, said casing comprising two flanged complemental sections secured together, an axial sleeve extending through said sections and secured to the feed shaft, said casing having relative rotary movement upon said sleeve, a control handle on one section of said casing to permit manual operation, and electroresponsive magnetic clutches housed within the complemental sections of the manually operable casing to releasably couple the latter to the feed shaft to normally permit forward and reverse drive of said shafts by the rotation of said handle.

17. In a manually operable machine tool convertible into a duplicating machine, a rotary cutter, a support for the cutter, a work support guided in a definite path relatively to the cutter and adapted to support a pattern and a work piece with the latter in position to be acted upon by the cutter, a feed shaft for moving the work support, a manually operable casing disposed on the feed shaft to actuate the latter, a pair of normally engaged reversely acting ratchet clutches located within and forming the operative connection between the manually operable casing and said feed shaft, electromagnetic means disposed with said casing for disengaging said clutches selectively, fixed terminal contacts in said casing in electrical circuit with said electromagnetic means, and rotary electrical conductors coaxially mounted in the manually operable casing and arranged in wiping contact with said fixed terminal contact means.

18. In a manually operable machine tool convertible into a duplicating machine, the combination of a work support, a feed shaft for the work support, a manually operable actuator for the feed shaft, a pair of normally engaged reversely acting ratchet clutches housed within and forming the operative connection between said actuator and the feed shaft, and controllable motor means housed within said actuator and serving when active to disengage said clutches selectively.

19. In a manually operable machine tool convertible into a duplicating machine, the combination of a work support, a feed shaft for the work support, a manually operable actuator for the feed shaft, a pair of normally engaging reversely acting ratchet clutches housed within and forming the operative connection between said actuator and the feed shaft and electromagnetic means housed within said actuator and serving when active to disengage said clutches selectively.

20. In a manually operable machine tool convertible into a duplicating machine, the combination of a feed shaft, a casing located on said feed shaft, means on said casing to manually rotate the latter and thereby actuate the feed shaft, a pair of normally engaged reversely acting ratchet clutches housed within and forming the operative connection between said casing and the feed shaft, and controllable motor means housed within said casing and serving when active to disengage said clutches selectively.

21. In a manually operable machine tool convertible into a duplicating machine, the combination of a feed shaft, a casing located on said feed shaft, means on said casing to manually rotate the latter and thereby actuate the feed shaft, a pair of normally engaged reversely acting ratchet clutches housed within and forming the operative connection between said casing and the feed shaft, and electromagnetic means housed within said casing and serving when active to disengage said clutches selectively.

CLAUDE DETLEV RIEPER.